United States Patent
Eastwood

(10) Patent No.: US 7,113,750 B2
(45) Date of Patent: Sep. 26, 2006

(54) APPARATUS AND METHOD FOR INPUT CHANNEL ISOLATION WITHIN AN ELECTRONIC TEST INSTRUMENT

(75) Inventor: James S. Eastwood, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 474 days.

(21) Appl. No.: 10/321,129

(22) Filed: Dec. 16, 2002

(65) Prior Publication Data

US 2004/0116094 A1 Jun. 17, 2004

(51) Int. Cl.
*H04B 1/38* (2006.01)
*G01R 19/00* (2006.01)

(52) U.S. Cl. .................... 455/73; 455/67.11; 455/41.1; 455/550.1; 455/102; 324/76.11

(58) Field of Classification Search ................ 455/73, 455/41.1, 67.11–67.14, 74–88, 550.1–575.9, 455/90.1–90.3, 102–119, 41.2, 41.3, 313, 455/334, 325, 319; 324/76.11, 118, 121
See application file for complete search history.

(56) References Cited

U.S. PATENT DOCUMENTS

| | | | | |
|---|---|---|---|---|
| 1,747,163 A | * | 2/1930 | Dickieson ............... | 455/67.11 |
| 3,350,504 A | * | 10/1967 | Takayanagi .............. | 455/67.12 |
| 3,569,845 A | * | 3/1971 | Steinberg .................... | 455/214 |
| 4,130,743 A | * | 12/1978 | Boulanger et al. ............ | 455/79 |
| 4,653,046 A | * | 3/1987 | Eisenhauer et al. ....... | 455/575.9 |
| 4,703,283 A | * | 10/1987 | Samuels .................... | 455/41.1 |
| 4,733,237 A | * | 3/1988 | Apostolos et al. ....... | 455/226.1 |
| 5,371,760 A | * | 12/1994 | Allen et al. .............. | 455/67.14 |
| 5,493,691 A | * | 2/1996 | Barrett ...................... | 455/41.1 |
| 5,768,690 A | * | 6/1998 | Yamada et al. ............... | 455/78 |
| 5,850,132 A | * | 12/1998 | Garces ........................ | 455/73 |
| 6,041,223 A | * | 3/2000 | Thomas ...................... | 455/323 |
| 6,072,994 A | * | 6/2000 | Phillips et al. ............ | 455/277.1 |
| 6,366,764 B1 | * | 4/2002 | Yang et al. ................... | 455/73 |
| 6,628,925 B1 | * | 9/2003 | Ishida et al. .................. | 455/73 |
| 2002/0106996 A1 | * | 8/2002 | Stengl et al. ............... | 455/109 |
| 2003/0076894 A1 | * | 4/2003 | Jin et al. .................... | 455/109 |
| 2004/0092229 A1 | * | 5/2004 | Hessel ....................... | 455/41.1 |

* cited by examiner

*Primary Examiner*—Lana Le
(74) *Attorney, Agent, or Firm*—Moser,Patterson,Sheridan, LLP; Thomas F. Lenihan

(57) ABSTRACT

An electrical isolation device wherein a signal to be electrically isolated is mixed with a carrier signal by a multiplier to produce a modulated carrier signal which is passed through an isolation barrier and demodulated and filtered to extract thereby the initial input signal.

11 Claims, 6 Drawing Sheets

SQUARE WAVE CARRIER    INPUT

DEMODULATED SIGNAL

FILTERED SIGNAL

SQUARE WAVE CARRIER    INPUT

DEMODULATED SIGNAL

FILTERED SIGNAL

SQUARE WAVE CARRIER   INPUT

DEMODULATED SIGNAL

610

FILTERED SIGNAL

APPARATUS AND METHOD FOR INPUT CHANNEL ISOLATION WITHIN AN ELECTRONIC TEST INSTRUMENT

FIELD OF THE INVENTION

The invention relates generally to signal analysis devices and, more particularly, to a method and apparatus for providing electrical isolation such as between a signal under test (SUT) and an electronic testing device.

BACKGROUND OF THE INVENTION

Signal acquisition devices or test and measurement devices such as digital storage oscilloscopes (DSOs) and the like receive one or more signals under test (SUT) via one or more respective input channels. It is important that the input channels be electrically isolated from each other and from the chassis ground of the test and measuring device. Such isolation is necessary for signals having a frequency from DC to the bandwidth of the measuring device. Such isolation allows multiple signals under test to be provided to, and analyzed by, the same measuring device without affecting the systems/signals under test.

One isolation method known to those skilled in the art for use in wide bandwidth systems is the so-called "two path scheme" in which an input signal is broken up into two signals; namely, a low frequency input signal and a high frequency input signal. Optocouplers are used for low frequency signals (e.g., signals under 1 MHz) and wide band transformers are used for the high frequency signals. Unfortunately, optocouplers are difficult and expensive to linearize, and wide band linear transformers are expensive. Additionally, it is difficult to insure that the resulting isolated low end high frequency signal components of the signals under test are sufficiently well matched such that they may be recombined to produce a "flat" signal suitable for further processing by the test and measurement device.

SUMMARY OF INVENTION

These and other deficiencies of the prior art are addressed by the present invention of a method and apparatus enabling the isolation of wide band signals in a manner avoiding the "two path scheme" and its inherent difficulties. One embodiment comprises an electrical isolation device (isolator) wherein a signal to be electrically isolated is mixed with a carrier signal by a multiplier to produce a modulated carrier signal which is passed through an isolation barrier and demodulated and filtered to extract thereby the initial input signal.

The subject invention is adapted, in one embodiment, to an apparatus comprising a modulator, for modulating an input signal onto a carrier signal to produce thereby a modulated carrier signal having associated with it a first ground reference; an isolation device, for processing the modulated signal to produce a corresponding modulated signal having associated with it a second ground reference; a demodulator, for demodulating the corresponding modulated signal and a corresponding carrier signal to produce thereby a demodulated signal; and a smoothing device, for retrieving a corresponding input signal from the demodulated signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention will be primarily described within the context of test and measurement devices such as digital storage oscilloscopes, analog oscilloscopes and the like. However, it will be appreciated by those skilled in the art that the invention may be advantageously employed in any environment where electrical isolation of a relatively wide bandwidth signal is desired.

Figure 1:
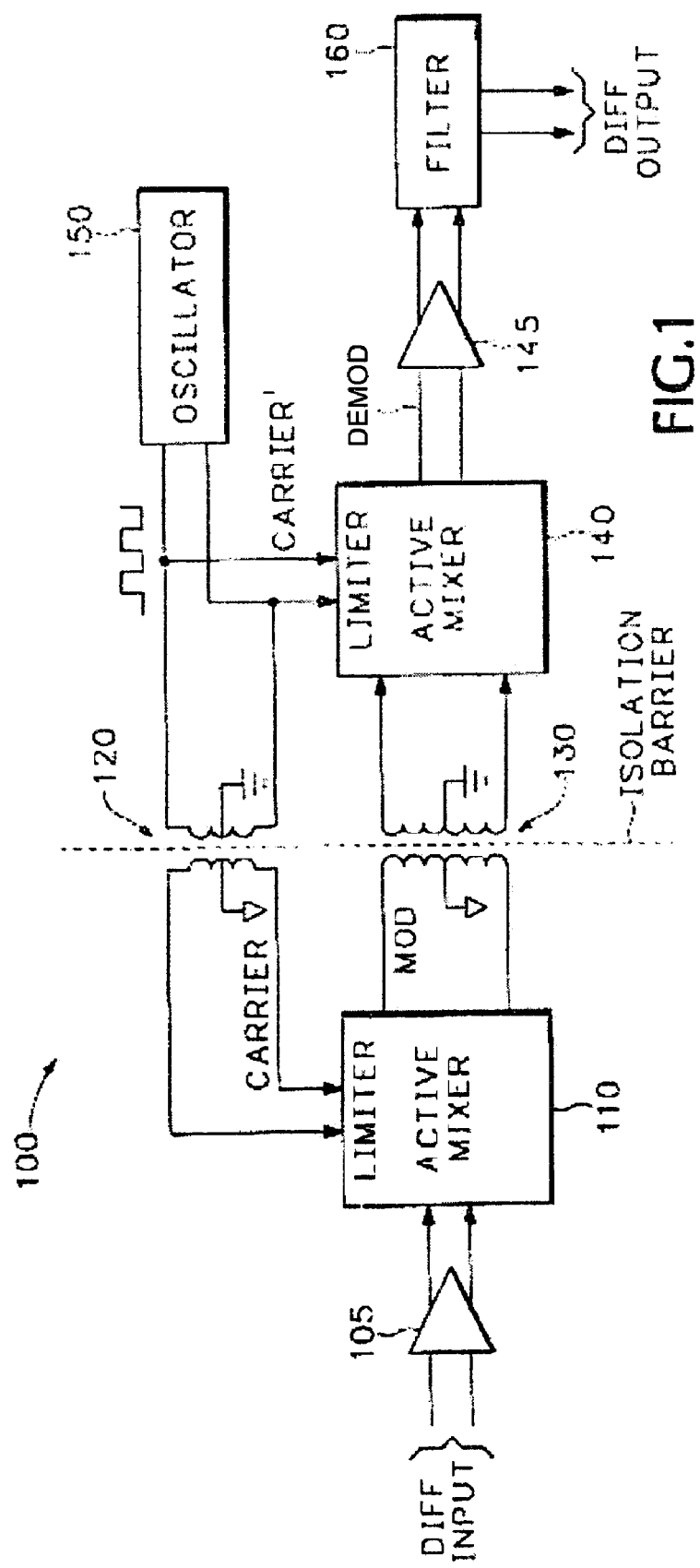
FIG. 1 depicts a high level block diagram of a signal isolation system according to an embodiment of the invention.

FIG. 1 depicts a high level block diagram of a signal isolation system according to an embodiment of the invention. Specifically, the system 100 of FIG. 1 comprises a first buffering device 105, a first active mixer 110, a first isolating device 120, a second isolating device 130, a second active mixer 140, a second buffering device 145, an oscillator 150 and a filter 160. It is noted that the first buffering device 105 and first mixer 110 are electrically isolated from the second active mixer 140, second buffering device 145, oscillator 150 and filter 160.

The system 100 receives a differential input signal and responsively produces a differential output signal which comprises an isolated or a corresponding version of the differential input signal. It will be appreciated by those skilled in the art and informed by the teachings of the present invention that the system 100 of FIG. 1 may also operate using non-differential input and output signals. However, noise immunity and other factors make the use of a differential input signal desirable, though not strictly necessary.

The differential input signal is buffered by the first buffering device 105 and coupled to the active mixer 110. The active mixer 110 operates to multiply or modulate the buffered differential input signal and a first carrier signal CARRIER to produce a modulated signal MOD. The modulated signal MOD is passed to an input portion of the second isolating device 130. The resulting isolated signal produced at the output portion of the second isolating device 130 is coupled to the second active mixer 140.

The second active mixer 140 receives a second carrier signal CARRIER' that is substantially identical to (though isolated from) the first carrier signal CARRIER provided to the first active mixer 110. The second active mixer 140 operates to demodulate the isolated and modulated differential input signal to produce therefrom a demodulated differential signal DEMOD.

The demodulated differential signal DEMOD is coupled to the filter 160 via the second buffering element 145. The filter 160 operates to smooth the demodulated differential signal DEMOD to produce therefrom a differential output signal having signal characteristics substantially similar to those of the differential input signal.

The oscillator 150 produces the second carrier signal CARRIER', illustratively a square wave, sine wave, triangular wave and the like having a frequency of tens to hundreds of MHz. The carrier signal CARRIER' is coupled directly to the second active mixer 140 and indirectly (through the first isolating device 120) to the first active mixer 110. Thus, in this embodiment, the output signal of the oscillator 150 is used to initially modulate the differential input signal and subsequently demodulate the resulting isolated and modulated differential input signal to produce thereby the demodulated differential signal DMOD. While the above-described frequencies are useful within the context of a test and measurement device requiring such bandwidth, much smaller frequencies (i.e., under 1 MHz) may be used depending upon the particular application.

In one embodiment of the invention, each of the buffers 105, 145 comprise Model AD8131 buffers, and model AD8343 active mixers, all manufactured by Analog Devices Incorporated of Norwood, Mass. The first 120 and second 130 isolators may comprise respective pulse transformers packaged together as the model A6801 transformer provided by Pulse Engineering Incorporated of San Diego, Calif. The first 120 and second 130 isolators may also comprise linear optocouplers, low power radio frequency (RF) transmitter/receiver pairs (i.e., antennas and associated circuitry), fiber optic devices and the like. It is noted that the frequencies requiring isolation are relatively high, therefore, optical isolation devices like linear optocouplers having operating ranges down to DC are not necessary, though such devices may be employed within the context of the present invention. The filter 160 may comprise a Bessel filter, a Gaussian filter, an Elliptical filter and the like.

In one embodiment, the oscillator 150 comprises a 242.42 MHz oscillator producing a square wave, the filter comprises a 200 MHz fifth-order low pass Bessel filter and the first and second isolators 120 and 130 comprise pulse transformers. In this embodiment, the first active mixer 110 operates to modulate the differential input signal by multiplying it by ±1 (i.e., convolution about the carrier signal). In this manner, the signal MOD produced by the first active mixer 110 comprises the differential input signal multiplied by a square wave via, for example, a switching operation. In this embodiment, the second active mixer 140 operates to synchronously demodulate the isolated and modulated signal provided by the second isolation device by convolution.

Figure 2:
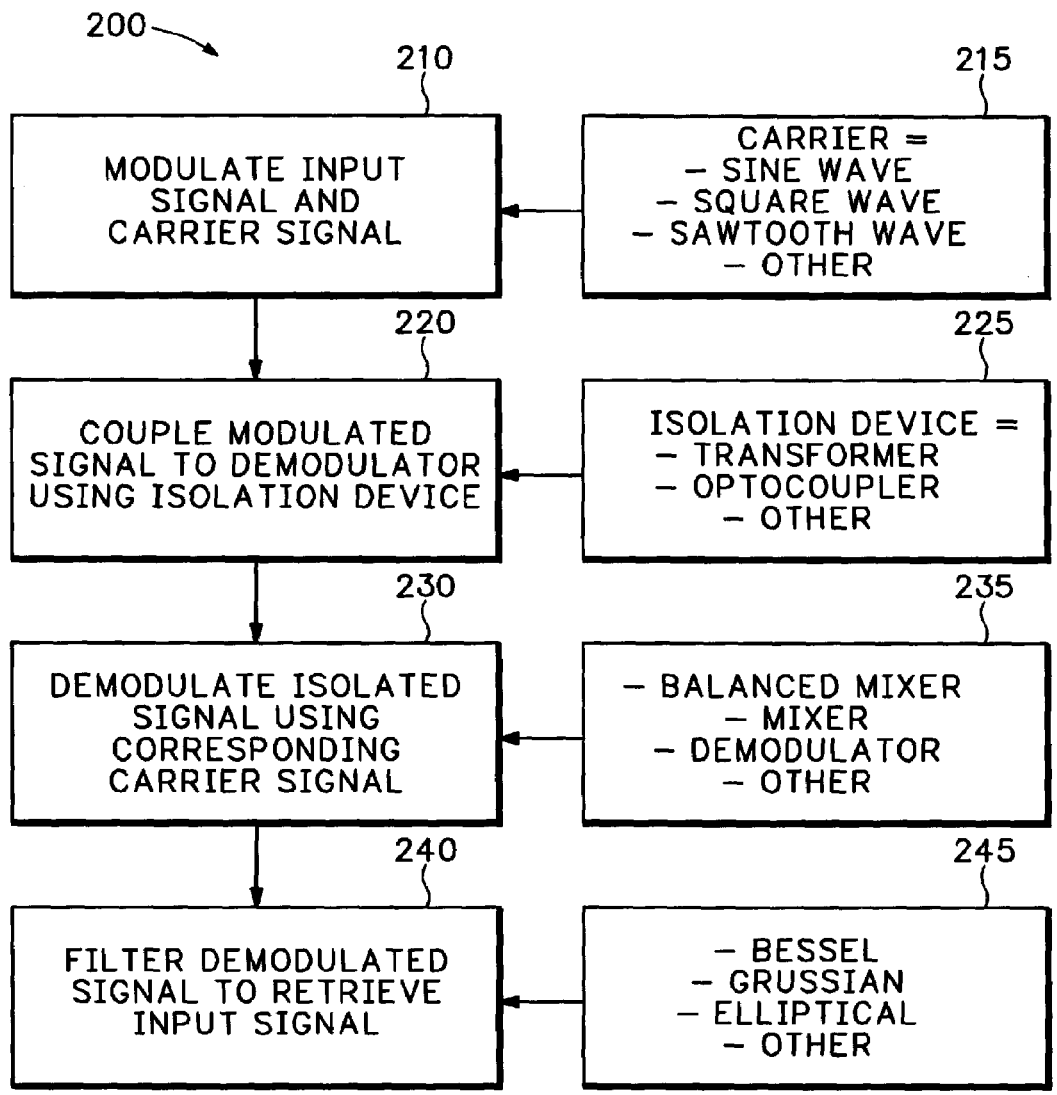
FIG. 2 depicts a flow diagram of a method according to an embodiment of the invention.

FIG. 2 depicts a flow diagram of a method according to an embodiment of the invention. The method 200 of FIG. 2 is entered at step 210, when a modulator (e.g., first active mixer 110) modulates an input signal onto a carrier signal. Referring to box 215, the carrier signal may comprise a sine wave, square wave, saw tooth wave or other wave shape.

At step 220, the modulated signal is coupled to a demodulator (e.g., second active mixer 140) using an isolation device (e.g., second isolation device 130). Referring to box 225, the isolation device may comprise a transformer, optocoupler, or other isolation device. The isolation device is used to ensure that the ground reference associated with the input signal may float with respect to the ground reference associated with a subsequent output signal.

At step 230, the isolated signal received from the isolation device is demodulated using a corresponding carrier signal. Referring to box 235, the demodulator (i.e., the second active mixer 140) employed for this task may comprise a balance mixer, an unbalanced mixer, a demodulator or other suitable device depending upon the type of modulation scheme employed by the first active mixer.

At step 240, the demodulated signal is filtered or smoothed to retrieve the input signal. Referring to box 245, the filtering or smoothing function employed may comprise a Bessel filter function, a Gaussian filter function, an Elliptical filter function or some other appropriate function.

Figure 3A:
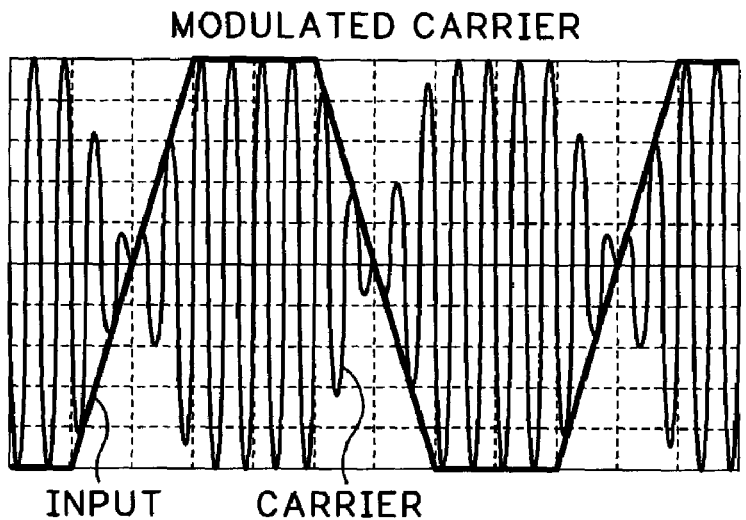
FIGS. 3–6 graphically depicts several waveforms useful in understanding the present invention.
Figure 3B:
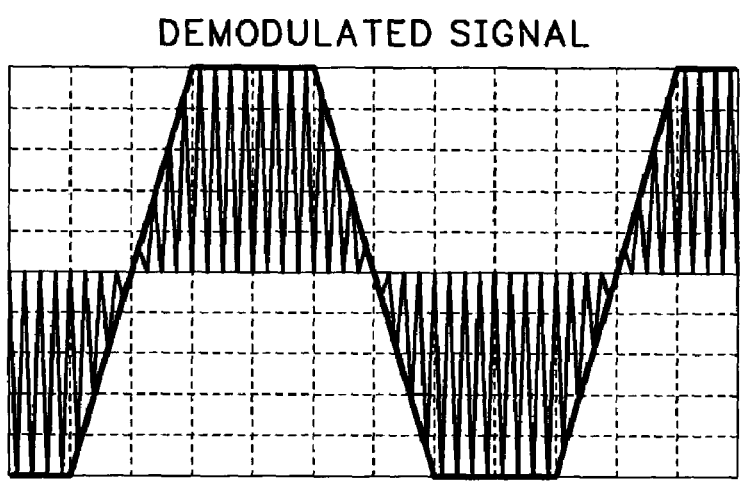
Figure 3C:
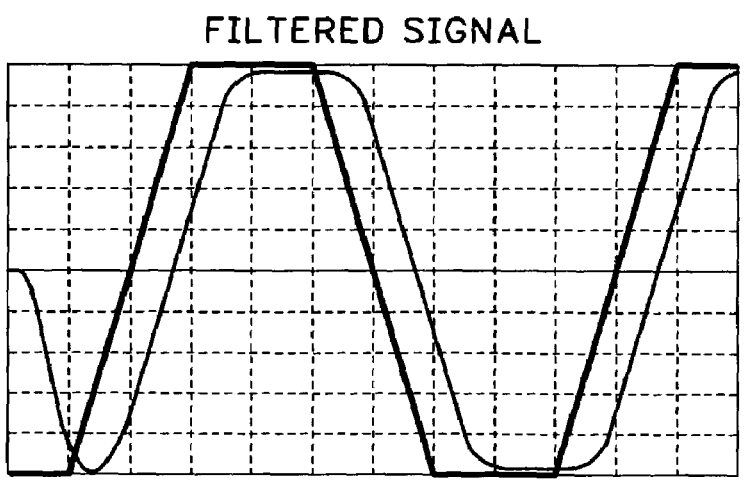

FIG. 3 graphically depicts several waveforms useful in understanding the present invention. Specifically, FIG. 3A depicts a waveform of the modulated signal MOD produced by the first active mixer 1110 (operating as a balanced mixer) in the case where a sine wave carrier signal is employed and the input signal frequency is lower than the carrier signal frequency. illustrating the output signal MOD produced by the first active mixer 110. FIG. 3B depicts a waveform illustrating the demodulated signal DEMOD produced by the second active mixer 140 (operating as a balanced mixer). FIG. 3C depicts the differential output signal produced by the filter 160. Each of the FIGS. 3A, 3B and 3C show for reference purposes an input signal and the actual signal at the point described.

Figure 4A:
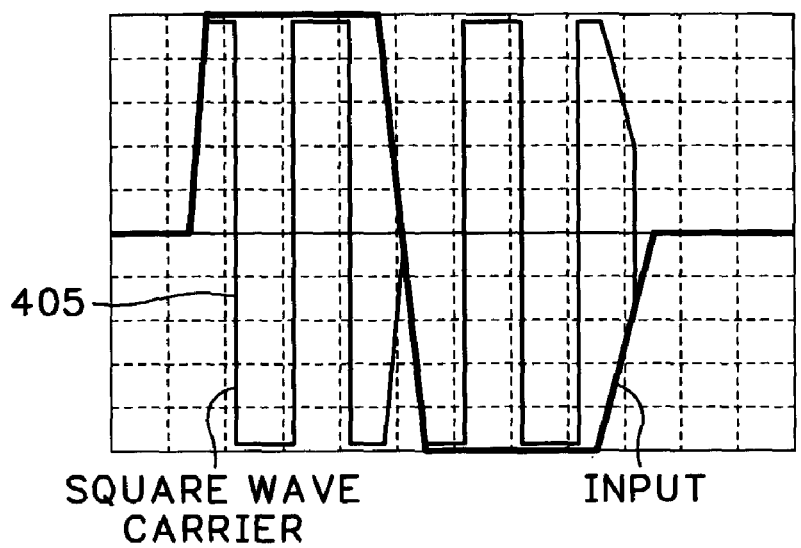
Figure 4B:
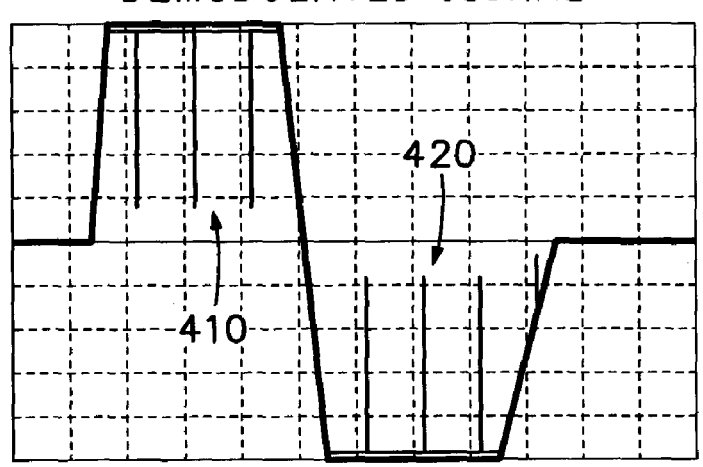
Figure 4C:
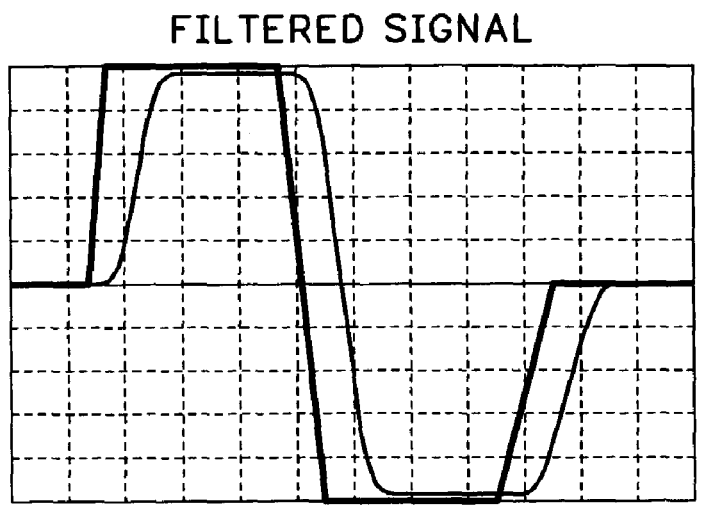

FIG. 4 graphically depicts several waveforms useful in understanding the present invention. Specifically, FIG. 4A depicts a waveform of the modulated signal MOD in the case where a square wave carrier signal is employed and the rise time of the input signal is faster than half the carrier signal period. FIG. 4B depicts a waveform illustrating the demodulated signal DEMOD produced by the second active mixer 140. It is noted that the demodulated signal comprises substantially the original input signal with several high speed glitches 410, 420 imparted to the input signal during the modulation process. It is noted that the glitches 410, 420 are very high in frequency in comparison to the input and carrier signals due to the use of a square wave carrier signal. As such, the realization of the filter 160 is simplified. FIG. 4C depicts the output signal provided by the filter 160. Each of the FIGS. 4A, 4B and 4C show for reference purposes an input signal and the actual signal at the point described.

Referring to FIG. 4A, it is noted that the input signal has an initial rising edge that occurs within the middle portion of the square wave carrier signal rather then at a transition portion of the square wave signal. It is important to note that the square wave modulation enables the capturing of substantially all of the phase/timing information. By contrast, using a sine wave carrier signal, the phase/timing information would not be captured as accurately due to the comparatively inhibited rise time of the sine wave edge. The graphical depictions herein illustrate the advantage of a square wave carrier signal in comparison to a sine wave carrier signal. In addition to the simplified realization of filter 160, the modulation/demodulation may be performed using a switching technique rather than the balanced multiplication technique (used with a sine wave carrier).

Figure 5A:
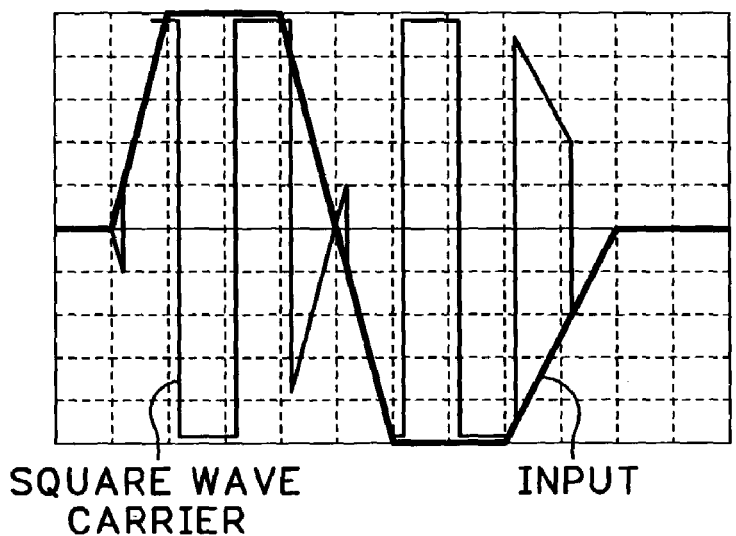
Figure 5B:
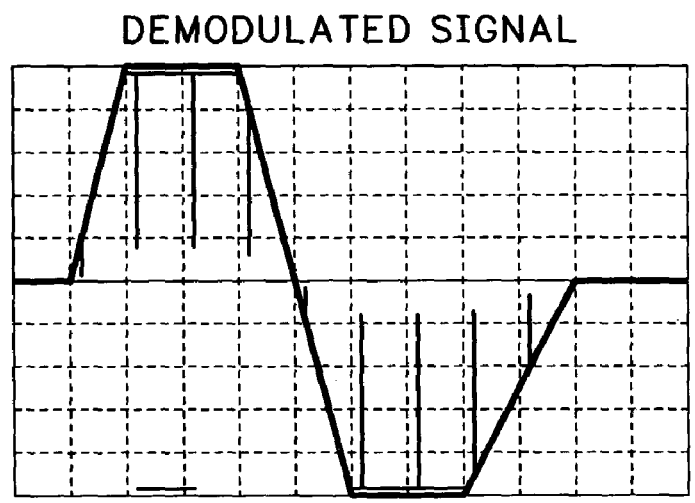
Figure 5C:
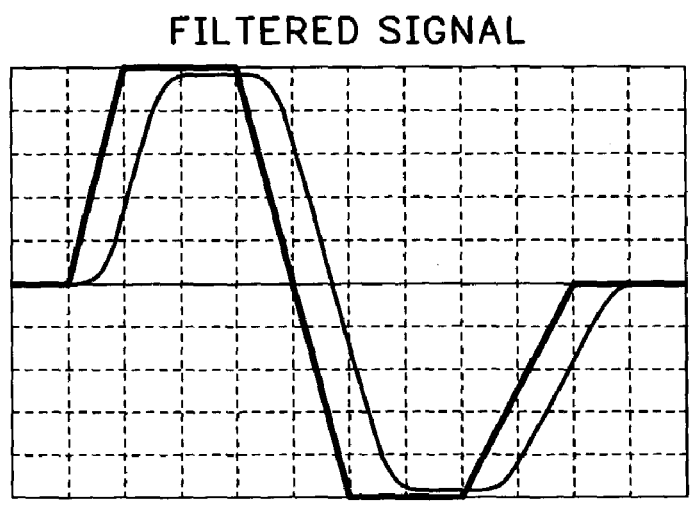

FIG. 5 graphically depicts several waveforms useful in understanding the present invention. Specifically, FIG. 5A depicts a waveform of the modulated signal MOD in the case where a square wave carrier signal is employed and the rise time of the input signal is slower than half the carrier signal period. FIG. 5B depicts a waveform illustrating the demodulated signal DEMOD produced by the second active mixer 140. It is noted that the demodulated signal comprises substantially the original input signal with several high speed glitches 510 imparted to the input signal during the modulation process. It is noted that the glitches 510 are very high in frequency in comparison to the input and carrier signals due to the use of a square wave carrier signal, thereby simplifying the realization of filter 160. FIG. 5C depicts the output signal provided by the filter 160. Each of the FIGS. 5A, 5B and 5C show for reference purposes an input signal and the actual signal at the point described.

Figure 6A:
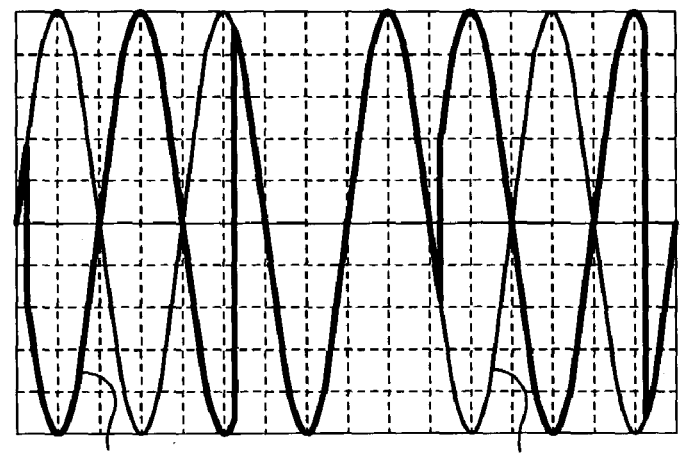
Figure 6B:
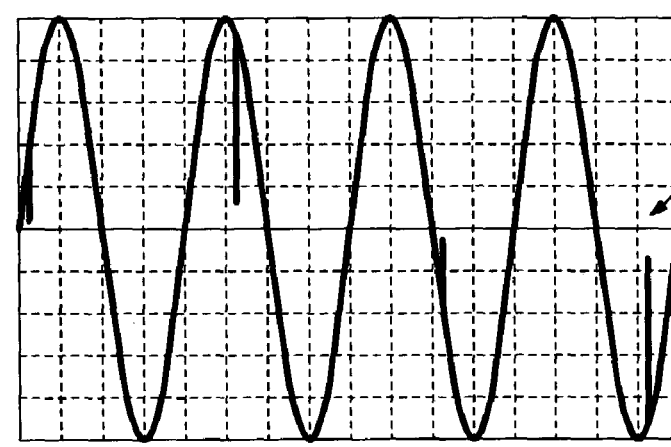
Figure 6C:
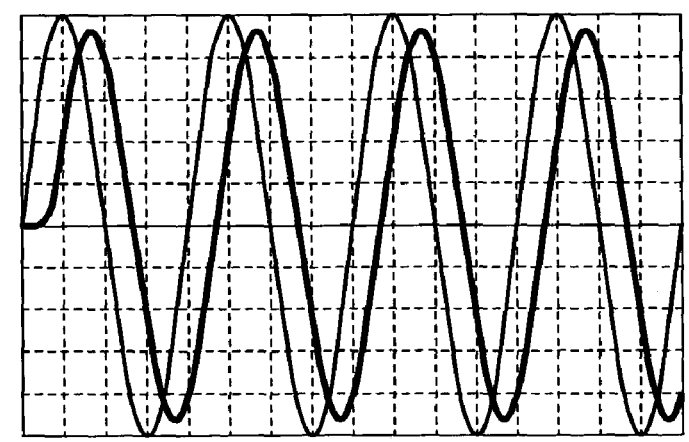

FIG. 6 graphically depicts several waveforms useful in understanding the present invention. Specifically, FIG. 6A depicts a waveform of the modulated signal MOD in the case where a square wave carrier signal is employed and the input signal is of a higher frequency that the carrier signal. FIG. 6B depicts a waveform illustrating the demodulated signal DEMOD produced by the second active mixer 140. It is noted that the demodulated signal comprises substantially the original input signal with several high speed glitches 610 imparted to the input signal during the modulation process. FIG. 6C depicts the output signal provided by the filter 160. Each of the FIGS. 6A, 6B and 6C show for reference purposes an input signal and the actual signal at the point described.

While the foregoing is directed to the preferred embodiment of the present invention, other and further embodiments of the invention may be devised without departing from the basic scope thereof, and the scope thereof is determined by the claims that follow.

What is claimed is:

1. Apparatus, comprising:
   a modulator, for modulating an input signal onto a carrier signal to produce a modulated carrier signal, said modulator being coupled to a first ground reference;
   a demodulator, for receiving a representation of said modulated carrier signal and a representation of said carrier signal for demodulating said representation of modulated carrier signal to produce a demodulated signal, said demodulator being coupled to a second ground reference, said first and second ground references being electrically isolated from each other;
   an isolator for receiving said modulated carrier signal from said modulator, producing said representation of modulated carrier signal, and conveying said representation of modulated carrier signal to said demodulator while maintaining said isolation of said first and second ground references; and
   a filter, for retrieving a corresponding input signal from said demodulated signal.

2. The apparatus of claim 1, wherein said modulator comprises a switch operating to multiply the input signal by ±1 in response to the carrier signal.

3. The apparatus of claim 1, wherein said modulator and demodulator comprise balanced mixers.

4. The apparatus of claim 1, wherein said isolator comprises a transformer.

5. The apparatus of claim 4, wherein said isolator comprises a pulse transformer and said carrier signal comprises a square wave having a frequency greater than twice the frequency of said input signal.

6. The apparatus of claim 1, further comprising:
   an oscillator for generating said carrier signal, said oscillator being coupled to one of said first and second ground references, said oscillator having an output directly coupled to one of said modulator and said demodulator; and
   a second isolator receiving said carrier signal and conveying a representation of said carrier signal to the other of said modulator and said demodulator while maintaining said isolation of said first and second ground references.

7. The apparatus of claim 6, wherein:
   said first and second isolators comprise transformers.

8. The apparatus of claim 7, wherein:
   said carrier signal and said representation of said carrier signal comprise respective square wave signals having a common predetermined frequency.

9. The apparatus of claim 8, wherein said predetermined frequency is less than an input signal frequency.

10. The apparatus of claim 1, wherein said filter comprises at least one of a Bessel filter, a Gaussian filter and an Elliptical filter.

11. A test and measurement instrument, comprising:
    a modulator, for modulating an input signal onto a carrier signal to produce thereby a modulated carrier signal, said modulator being coupled to a first ground reference;
    a demodulator, for receiving a representation of said modulated carrier signal and a representation of said carrier signal for demodulating said representation of modulated carrier signal to produce a demodulated signal, said demodulator being coupled to a second ground reference, said first and second ground references being electrically isolated from each other,
    an isolator for receiving said modulated carrier signal from said modulator, producing said representation of modulated carrier signal, and conveying said representation of modulated carrier signal to said demodulator while maintaining said isolation of said first and second ground references; and
    a filter, for retrieving a corresponding input signal from said demodulated signal.

* * * * *